United States Patent
Muller (10) Patent No.: US 9,791,182 B2
(45) Date of Patent: Oct. 17, 2017

(54) MAGNETOCALORIC HEAT GENERATOR

(71) Applicant: COOLTECH APPLICATIONS S.A.S., Holtzheim (FR)

(72) Inventor: Christian Muller, Strasbourg (FR)

(73) Assignee: Cooltech Applications S.A.S., Holtzheim (FR)

( * ) Notice: Subject to any disclaimer, the term of this patent is extended or adjusted under 35 U.S.C. 154(b) by 556 days.

(21) Appl. No.: 14/358,389

(22) PCT Filed: Nov. 26, 2012

(86) PCT No.: PCT/IB2012/002485
§ 371 (c)(1),
(2) Date: May 15, 2014

(87) PCT Pub. No.: WO2013/076571
PCT Pub. Date: May 30, 2013

(65) Prior Publication Data
US 2014/0290275 A1    Oct. 2, 2014

(30) Foreign Application Priority Data
Nov. 24, 2011 (FR) .................... 11 60722

(51) Int. Cl.
*F25B 21/00* (2006.01)

(52) U.S. Cl.
CPC ...... *F25B 21/00* (2013.01); *F25B 2321/0021* (2013.01); *Y02B 30/66* (2013.01)

(58) Field of Classification Search
CPC ............. F25B 21/00; F25B 2321/002; F25B 2321/0021; F25B 2321/0022; F25B 2321/0023; Y02B 30/66
See application file for complete search history.

(56) References Cited

U.S. PATENT DOCUMENTS 4,704,871 A * 11/1987 Barclay .................. F25B 21/00
                                                         62/3.1
5,444,983 A *  8/1995 Howard ................. F25B 21/00
                                                         62/3.1
(Continued)

FOREIGN PATENT DOCUMENTS

FR        2937793 A1      4/2010
WO    2004/059222 A1      7/2004
WO  WO-2011135205 A1 *    3/2011   .............. F25B 21/00

OTHER PUBLICATIONS

Yao G.H. et al., Experimental Study on the Performance of a Room Temperature Magnetic Refrigerator Using Permanent Magnets, International Journal of Regrigeration, Elsevier, Paris, FR, vol. 29, No. 8, Dec. 1, 2006, pp. 1267-1273 See International Search Report.
(Continued)

*Primary Examiner* — Orlando E Aviles Bosques
(74) *Attorney, Agent, or Firm* — Davis & Bujold PLLC; Michael J. Bujold (57) ABSTRACT

A magnetocaloric heat generator having an assembly of at least two magnetocaloric modules with a heat transfer fluid flowing through them. The cold ends of the modules are in fluidic communication via a cold transfer circuit and the hot ends are in fluidic communication via a hot transfer circuit. The cold transfer circuit is arranged so that the fluid exiting the cold end of one of the magnetocaloric modules with an exit temperature enters the cold end of the other magnetocaloric module with an entry temperature that is substantially equal to the temperature of the cold end. The hot transfer circuit modifies the temperature of the fluid so that the fluid exiting the hot end of one of the magnetocaloric modules with an exit temperature enters the hot end of the other magnetocaloric module with an entry temperature that is substantially equal to the temperature of the hot end.

16 Claims, 10 Drawing Sheets

(56) References Cited

U.S. PATENT DOCUMENTS

2006/0080979 A1    4/2006  Kitanovski et al.
2013/0042632 A1*   2/2013  Muller .................. F25B 21/00
                                                        62/3.1

OTHER PUBLICATIONS

Degregoria A.J., et al., Test Results of an Active Magnetic Regenerative Refrigerator, Technical Report—Lest Foundation, Oslo, Norway, vol. 37, No. Part B, Jan. 1, 1992, pp. 875-882 See International Search Report.
International Search Report for corresponding PCT application PCT/IB2012/002485 dated Feb. 11, 2013.
English Translation of the Written Opinion corresponding to PCT/IB2012/002485 dated Feb. 11, 2013.
Muller, C, Refrigeration Magnetique, Une Revolution Pour Demain?, Revue Pratique Du Froid Et Du Conditionement D'Air, Pyc Edition Sa., Paris FR, No. 924, Apr. 1, 2004, pp. 59-83.

* cited by examiner

MAGNETOCALORIC HEAT GENERATOR

This is a national stage completion of PCT/IB2012/002485 filed Nov. 26, 2012 which claims priority from French Application Serial No. 11/60722 filed Nov. 24, 2011.

TECHNICAL SCOPE

The present invention relates to a magnetocaloric heat generator comprising at least one assembly of at least two magnetocaloric modules with a heat transfer fluid circulated by circulating means flowing through them.

PRIOR ART

Magnetic refrigeration technology at ambient temperature has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of a magnetocaloric heat generator, by adjusting the various parameters, such as the magnetization power, the performances of the magnetocaloric materials, the heat exchange surface between the heat transfer fluid and the magnetocaloric materials, the performances of the heat exchangers, etc.

A magnetocaloric heat generator comprises magnetocaloric materials that have the ability to heat up under the action of a magnetic field and that cool down when this magnetic field is removed or reduced. This so-called magnetocaloric effect is exploited to achieve a thermal gradient between the two ends called hot end and cold end of a heat generator. To that purpose, one circulates a heat transfer fluid alternately through the magnetocaloric materials in a first direction (towards the hot end of the generator) when the magnetic field is applied or increases, and in the opposite direction (towards the cold end) when the magnetic field is removed or decreases.

Figure 1A:
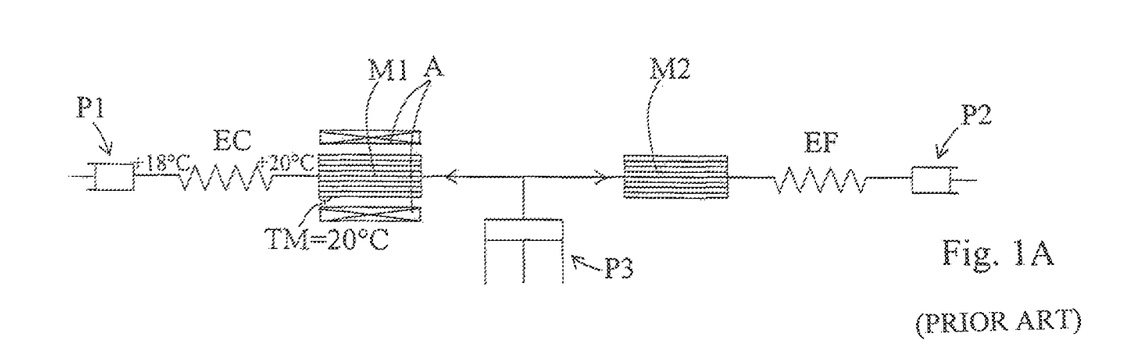
FIGS. 1A and 1B represent schematically a magnetocaloric unit according to the prior art during two successive phases of a magnetocaloric cycle.
Figure 1B:
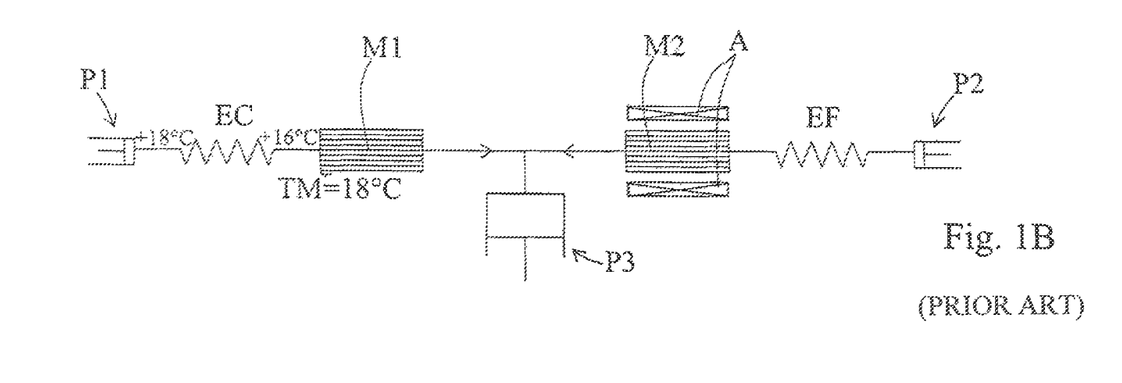

Now, the fact of achieving a heat exchange with an external application in the form of a heating, cooling, air-conditioning, tempering, etc., system has the effect of reducing and limiting the thermal gradient within the magnetocaloric materials, which leads to thermal energy loss inside of the generator. It is necessary to use a part of the thermal energy produced to re-establish a thermal gradient, which will reduce the available thermal output. This is illustrated referring to FIGS. 1A and 1B, which represent a magnetocaloric set including two magnetocaloric stages M1 and M2, whose cold end is in thermal and fluidic communication with a heat exchanger called cold exchanger EF and with a piston P2, and whose hot end is in communication with a heat exchanger called hot exchanger EC and with a piston P1. Another piston P3 is installed between the two stages. Considering only the magnetocaloric stage M1 located on the hot side, during a magnetocaloric cycle, at the end of a heating phase of the magnetocaloric stage M1 due to the application of a magnetic field by magnets A, the fluid exiting magnetocaloric stage M1 has a temperature of 20° C., flows through the heat exchanger EC and reaches piston P1 with a temperature of for example 18° C. after the heat exchange performed in hot exchanger EC (see FIG. 1A). The magnetic field is then reversed, as well as the flowing direction of the fluid, so that, at the end of the subsequent cooling phase, the fluid first flows through the hot exchanger EC and therefore enters the magnetocaloric stage M1 at a temperature of 16° C. due to the new heat exchange in the hot exchanger EC (see FIG. 1B). Now, since the temperature of the fluid (16° C.) is lower than the temperature of the material forming the end of the magnetocaloric stage M1 (18° C.), a heat exchange takes place when the fluid enters the magnetocaloric stage M1. This exchange reduces the thermal gradient in the magnetocaloric stage M1 and leads to heat losses, therefore reducing the useful thermal output of the corresponding heat generator. The same demonstration applies to the cold side.

Another disadvantage of this type of configuration relates to the high number of pistons or circulating means required to circulate the heat transfer fluid, which leads to large dimensions and requires an important amount of energy for its actuation.

Figure 2:
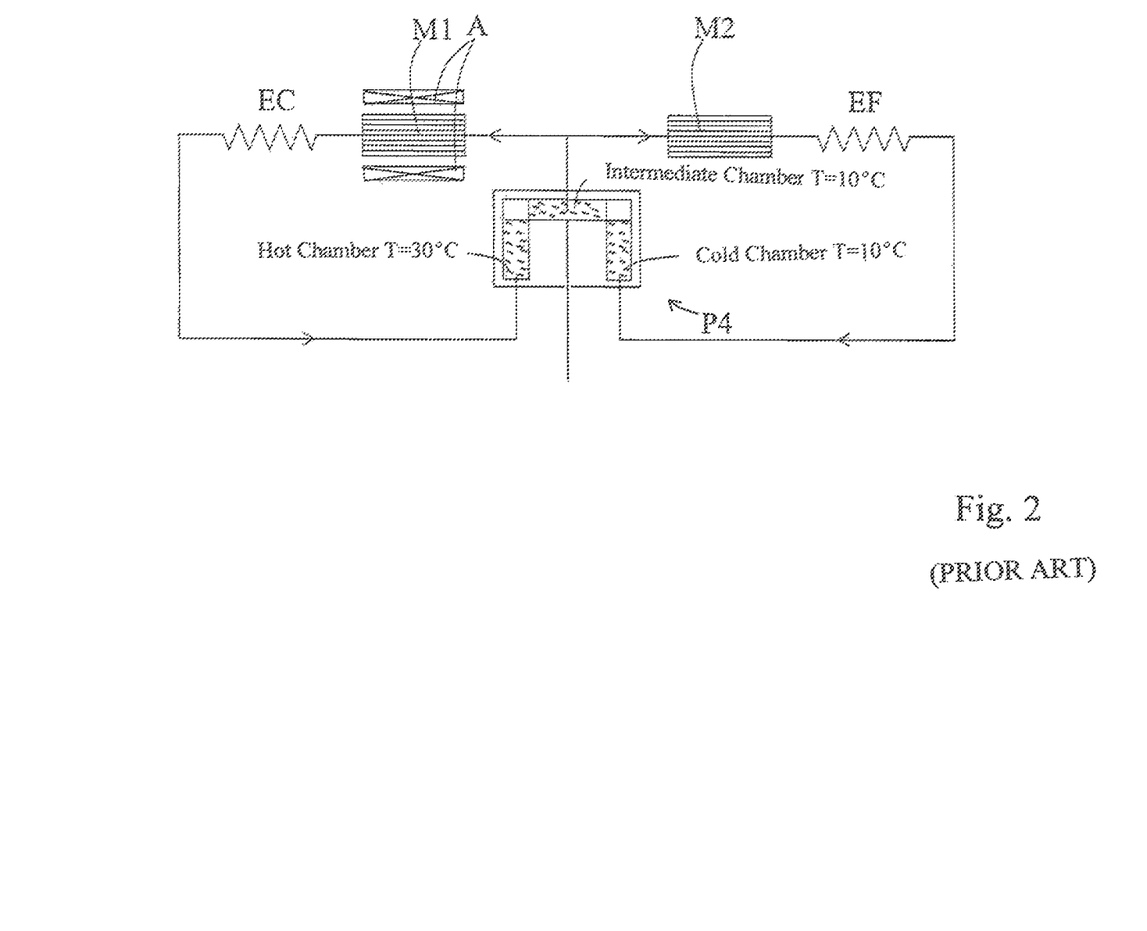
FIG. 2 represents another magnetocaloric unit according to the prior art.

A solution designed to reduce these dimensions is represented in FIG. 2. It consists in putting together the three chambers of the three pistons of FIGS. 1A and 1B and in realizing one single actuation. So, when the hot and cold chambers of this specific piston P4 fill, the intermediate chamber empties, and vice-versa. However, with this solution, the hot, cold and intermediate chambers are located close to each other, with thermal bridges, which may lead to a heat exchange between the different chambers and results in a deterioration in the efficiency of the magnetocaloric heat generator.

In the paper of C. Muller "Réfrigération magnëtique, une révolution pour demain?" (Magnetic cooling, a revolution for tomorrow?) (Revue pratique du froid et du conditionnement d'air, PYC Edition SA, Paris, FR, no. 924 of 1 Apr. 2004, pages 59-63) and in publication U.S. Pat. No. 4,704,871 the heat generators include two magnetocaloric modules connected serially in a closed heat transfer fluid loop comprising the heat exchangers and a circulating pump for said fluid, each module being limited to one stage of magnetocaloric material, which does not allow reaching high temperature gradients.

So there is a need for improvement and optimization of the size of a magnetocaloric heat generator and of its heat exchanges with one or several external applications.

In addition, another aspect liable to be improved in the magnetocaloric heat generators relates to the total energy necessary for the operation of the magnetocaloric heat generator in order to improve the efficiency of said generator.

Finally, in addition to the need for an usable energy efficiency, a magnetocaloric heat generator must also have a reduced size or volume, allowing for example to integrate it in a household appliance, a vehicle, etc.

DESCRIPTION OF THE INVENTION

The present invention aims to meet the above constraints and to offer a magnetocaloric heat generator with an increased thermal efficiency.

To this purpose, the invention relates to a magnetocaloric heat generator of the kind described in the preamble, characterized in that each magnetocaloric module comprises at least two magnetocaloric stages of magnetocaloric material(s), said at least two stages being constantly in a different magnetic phase, in that said heat transfer fluid circulating means are in fluidic communication with said magnetocaloric stages of at least one magnetocaloric module, in that the magnetocaloric stages are made of magnetocaloric materials arranged so that the magnetocaloric effect is substantially the same in all magnetocaloric stages, in that the cold ends of said magnetocaloric modules are in fluidic communication by means of a cold transfer circuit used by said heat transfer fluid and intended for a heat exchange with an circuit by means of a heat exchanger, in that the hot ends of the magnetocaloric modules are in fluidic communication by means of a hot transfer circuit used by said heat transfer fluid and intended for a heat exchange with an external circuit by means of a heat exchanger, and in that the heat exchangers are arranged so that the difference of the inlet and outlet temperatures of the heat transfer fluid in said exchangers is substantially equal to the variation of the temperature of the heat transfer fluid in contact with a magnetocaloric stage subjected to the magnetocaloric effect. The magnetocaloric effect is the temperature jump or shift of a magnetocaloric stage when its magnetic phase changes, that is to say when it undergoes a magnetization phase and heats up, or when it undergoes a demagnetization phase and cools down.

It is this way possible to "extract" half of the temperature difference between the two magnetocaloric stages connected by a transfer circuit. This allows not to degrade the temperature gradient present in the various magnetocaloric stages and to ensure a heat exchange with the outside of the heat generator without impairing its efficiency.

According to the invention, the heat exchangers can thus perform a controlled heat exchange so that said cold transfer circuit modifies the temperature of said heat transfer fluid in such a way that the heat transfer fluid exiting the cold end of one of the magnetic modules with an exit temperature enters the cold end of the corresponding other magnetocaloric module with an entry temperature substantially equal to the temperature of said cold end, and that said hot transfer circuit modifies the temperature of said heat transfer fluid in such a way that the heat transfer fluid exiting the hot end of one of said magnetic modules with an exit temperature enters the hot end of the corresponding other magnetocaloric module with an entry temperature substantially equal to the temperature of said hot end.

Substantially equal means that the temperature of the heat transfer fluid is equal to the temperature of the concerned end with a maximum temperature difference corresponding to forty percent of the magnetocaloric effect (which itself depends on the magnetic field).

The result is that, at any time of the magnetocaloric cycle, the average temperature of the heat transfer fluid entering the chamber of a piston is equal to the average temperature of the heat transfer fluid exiting the other piston chambers According to the invention, said magnetocaloric modules can include at least two magnetocaloric sub-modules including each at least two magnetocaloric stages and, in said magnetocaloric modules, said sub-modules can be mounted in parallel.

Said circulating means can preferably be connected between consecutive ends of the magnetocaloric stages that are not located near the cold and hot sides of the magnetocaloric modules.

According to the invention, said sub-module can comprise at least two groups of magnetocaloric stages, said groups being in fluidic communication with each other thanks to a heat transfer fluid circulating means and, in each group, the magnetocaloric stages can be connected serially.

In a variant, an intermediate heat exchanger can be arranged between two consecutive magnetocaloric stages of said groups.

Moreover, said intermediate heat exchanger can be connected to the heat exchanger of one of said transfer circuits. To this purpose, all or some of the intermediate heat exchangers located on the hot side of the magnetocaloric heat generator can be connected to the heat exchanger of the hot transfer circuit and all or some of the intermediate heat exchangers located on the cold side of the magnetocaloric heat generator can be connected to the heat exchanger of the cold transfer circuit.

As a variant, the intermediate heat exchangers of the groups connected to the cold transfer circuit can be connected to each other and the intermediate heat exchangers of the groups connected to the hot transfer circuit can be connected to each other. This allows in particular to accelerate the obtaining of a thermal gradient between the cold and hot sides of the magnetocaloric heat generator.

In an embodiment variant, said circulating means can be realized in the form of single-acting pistons and the chamber of each piston can be in fluidic communication with the magnetocaloric stages of a magnetocaloric module.

In another variant, said circulating means can be realized in the form of a double-acting piston, each chamber of said piston can be in fluidic communication with the magnetocaloric stages of a magnetocaloric module.

The generator according to the invention can moreover comprise a magnetic system arranged to subject the magnetocaloric stages to a variable magnetic field so that the magnetocaloric stages located at the cold end and the magnetocaloric stages located at the hot end are constantly in a different heating or cooling phase.

In addition, according to the invention, in order to optimize the size of the heat generator, the magnetocaloric stages can be mounted in disk-shaped supports, each support including at least one magnetocaloric stage of each magnetocaloric module.

BRIEF DESCRIPTION OF THE DRAWINGS

The present invention and its advantages will be better revealed in the following description of embodiments given as a non limiting example, in reference to the drawings in appendix, in which.

ILLUSTRATIONS OF THE INVENTION

In the illustrated embodiments, the identical pieces or parts have the same numerical references.

Figure 3:
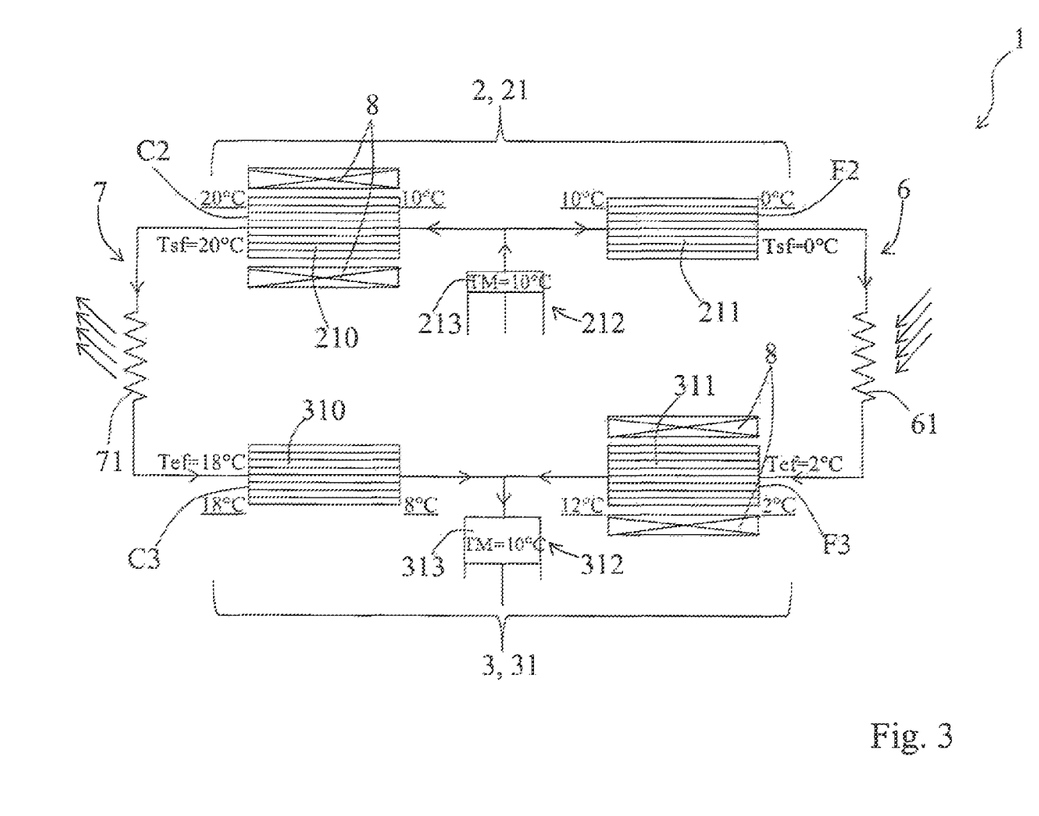
FIG. 3 is a schematic view of a magnetocaloric unit according to the invention, in a first phase of a magnetocaloric cycle.

FIG. 3 represents an assembly of two magnetocaloric modules 2, 3 of a heat generator 1 according to the invention. Each magnetocaloric module 2, 3 includes two magnetocaloric stages 210, 211, 310, 311. Each magnetocaloric stage 210, 211, 310, 311 comprises at least one magnetocaloric material having the ability to cool down and heat up under the effect of the variations of a magnetic field.

In the embodiment example described with reference to FIG. 3, the magnetocaloric modules 2, 3 comprise one single sub-module 21, 31 including in turn the two magnetocaloric stages 210, 211, 310, 311. The invention however is not tied to the integration of two magnetocaloric stages 210, 211, 310, 311 in each magnetocaloric sub-module 21, 31. It can be considered to integrate a higher number of such magnetocaloric stages 210, 211, 310, 311. Likewise, it is possible to integrate at least two magnetocaloric sub-modules connected in parallel in every magnetocaloric module. Such a configuration is more specifically represented in FIGS. 5 and 6.

The magnetocaloric stages 210, 211, 310, 311 are in fluidic communication by means of a heat transfer fluid, preferably a liquid. To this purpose, the magnetocaloric stages 210, 211, 310, 311 are permeable to the heat transfer fluid and include through fluid channels obtained by means of an assembly of plates out of magnetocaloric material(s) spaced from each other. Any other embodiment allowing the heat transfer fluid to flow through said magnetocaloric stages 210, 211, 310, 311 may of course be suitable. Moreover, the invention is not restricted to the use of magnetocaloric stages 210, 211, 310, 311 with a rectilinear structure as represented in the attached FIGS. 3 to 6, but it extends to any other structure such as a circular or a combined circular/rectilinear structure.

According to the invention, the specific configuration described hereafter that consists in connecting fluidically the two magnetocaloric modules 2, 3 by means of two transfer circuits 6 and 7 allows achieving heat exchanges with two external circuits without degrading the temperature gradient established in each of said magnetocaloric stages 210, 211, 310, 311. This connection between the magnetocaloric modules 2 and 3 is achieved in a continuous and permanent manner that is to say that said magnetocaloric modules are constantly connected with each other through the transfer circuits 6 and 7.

To this purpose, the magnetocaloric stages 210, 211, 310, 311 of each magnetocaloric sub-module 21, 31 are connected with each other through a heat transfer fluid circuit provided with a single-acting piston 212, 312 arranged between the two magnetocaloric stages 210, 211, 310, 311 of a magnetocaloric sub-module 21, 31 in order to circulate the heat transfer fluid. In other words, the chamber 213, 313 of each piston 212, 312 is in fluidic communication with all magnetocaloric stages 210, 211, respectively 310, 311 of a magnetocaloric module 2, 3. In every magnetocaloric sub-module 21, 31, the two magnetocaloric stages 210, 211, 310, 311 are constantly in a different magnetic phase, that is to say that, when one of said magnetocaloric stages 210, 311 undergoes a temperature rise due to the application of a magnetic field, the other magnetocaloric stage 211, 310 undergoes a temperature drop due to the removing or reduction of the magnetic field. The heat transfer fluid circulates to this purpose simultaneously in two opposite directions in the corresponding magnetocaloric stages 210, 211, 310, 311 of each magnetocaloric sub-module 21, 31. One achieves this way a parallel assembly between the cold branch and the hot branch of said generator, consisting respectively of the magnetocaloric stages connected to the said cold 61 and hot 71 exchangers. The circulation pattern of the fluid in these stages according to their magnetic phase is described more in detail in patent application FR 2 937 793 by the applicant, which is incorporated by reference.

So, in comparison with the generators according to the prior art described above and illustrated in FIGS. 1A and 1B, the circulating means for the fluid or pistons 212, 312 are mounted only between the magnetocaloric stages 210, 211, 310, 311 of the sub-modules 21, 31. This allows reducing the number of pistons or devices able to circulate the heat transfer fluid and therefore reducing the number of components of the generator, as well as its size and cost. A heat generator 1 according to the invention, represented in FIGS. 3 and 4, comprises two pistons 212, 312 for four magnetocaloric stages 210, 211, 310, 311, while, in some of the known generators, six pistons are used to circulate the heat transfer fluid through four thermal stages. Therefore, in this configuration, the energy required to circulate the heat transfer fluid is also reduced, allowing an improvement of the efficiency of the generator. Finally, such a heat generator 1 allows, while being compact and using a limited number of components, to remove the thermal bridges between the various chambers of the pistons.

The magnetocaloric stages 210, 211, 310, 311 comprise magnetocaloric materials able to set up a temperature gradient between their two heat transfer fluid entry and exit ends. This gradient is achieved thanks to the succession of magnetocaloric cycles consisting in:

applying a magnetic field to a magnetocaloric stage, which leads to its heating, then circulating the heat transfer fluid from the so-called "cold end" towards the so-called "hot end" of the magnetocaloric stage (first phase of the cycle), then removing or reducing the magnetic field, which leads to the cooling of the magnetocaloric stage, then circulating the heat transfer fluid from the hot end towards the cold end of the magnetocaloric stage (second phase of the cycle).

In each magnetocaloric sub-module 21, 31, the magnetocaloric stages 210, 211, 310, 311 include different magnetocaloric materials able to achieve shifted temperature gradients and the thermal stages 210, 211, 310, 311 are mounted in the sub-modules 21, 31 so that the thermal stage 211, 311 including the coldest end F2, respectively F3, is mounted on the cold side of the generator (located on the right side on FIGS. 3 and 4) and is directly connected to the cold transfer circuit 6, and that the thermal stage 210, 3101 including the hottest end C2, respectively C3, is mounted on the hot side of the generator (located on the left side on FIGS. 3 and 4) and is directly connected to the hot transfer circuit 7.

The magnetocaloric stages 211, 311 located on the cold side of the heat generator 1 have substantially the same thermal gradient and the same magnetocaloric effect, that is to say that, in steady state, on the one hand, the temperature difference between the two ends of stages 211, 311 is the same and, on the other hand, the temperature shift or temperature jump of the materials of these magnetocaloric stages 211, 311 is the same for a same magnetocaloric cycle. The same applies to the magnetocaloric stages 210, 310 located on the hot side of heat generator 1. Moreover, the magnetocaloric effect, that is to say the temperature jump or shift due to the variation of the magnetic field is substantially the same for all magnetocaloric stages 210, 211, 310, 311 of this heat generator 1.

The magnetocaloric stages 210, 211 and 310, 311 respectively of the hot and cold ends are in fluidic communication through a transfer circuit 7, 6 including a respectively cold and hot heat exchanger 71, 61. The two magnetocaloric stages 210, 310 and 211, 311 connected by a transfer circuit 7, 6 are also constantly in a different magnetic phase, that is to say that, when one of said magnetocaloric stages 210, 311 is subjected to a magnetic field (with an intensity of for example 1.2 Tesla), the other magnetocaloric stage 310, 211 it is connected to through transfer circuit 7, 6 is not subjected to any magnetic field, and vice-versa.

The change of intensity of the magnetic field applied to the magnetocaloric stages 210, 211, 310, 311 can be achieved with a magnetic system 8 comprising permanent magnets associated or not with pole pieces and in relative movement with respect to said magnetocaloric stages 210, 211, 310, 311, or with an electrically powered coil, or by any other equivalent means.

The exchangers 61, 71 of transfer circuits 6, 7 perform a controlled heat exchange between the cold side of the generator and a first external circuit (not represented) and between the hot side of the generator and a second external circuit (not represented). According to the invention, the heat exchangers 61, 71 are parameterized to exchange with the external circuits, during operation, an amount of energy corresponding preferably to the temperature difference between the two corresponding ends of the magnetocaloric stages 210, 211 and 310, 311 connected by transfer circuit 6, 7. This parameterizing is achieved thanks to the exchange surfaces in exchanger 61, 71, the selection of the heat transfer fluids or liquids in terms of exchange capacity, the flow rate of these fluids, so that the energy exchanged in exchanger 61, 71 with the heat transfer fluid circulating in heat generator 1 according to the invention corresponds substantially to the difference between the temperature of this heat transfer fluid when it enters a magnetocaloric stage 210, 211, 310, 311 subjected to the magnetocaloric effect and the temperature of this fluid when it exits it.

Such a measure allows matching as close as possible the temperature of the heat transfer fluid that passed through transfer circuit 6, 7 to the temperature of the end of the corresponding magnetocaloric stage 210, 211, 310, 311. From this results, on the one hand, that the heat transfer fluid will not perturb the thermal gradient in the concerned magnetocaloric stage 210, 211, 310, 311 and, on the other hand, that the thermal energy exchanged with the outside will be exploited positively, without leading to a loss of efficiency of heat generator 1.

Figure 4:
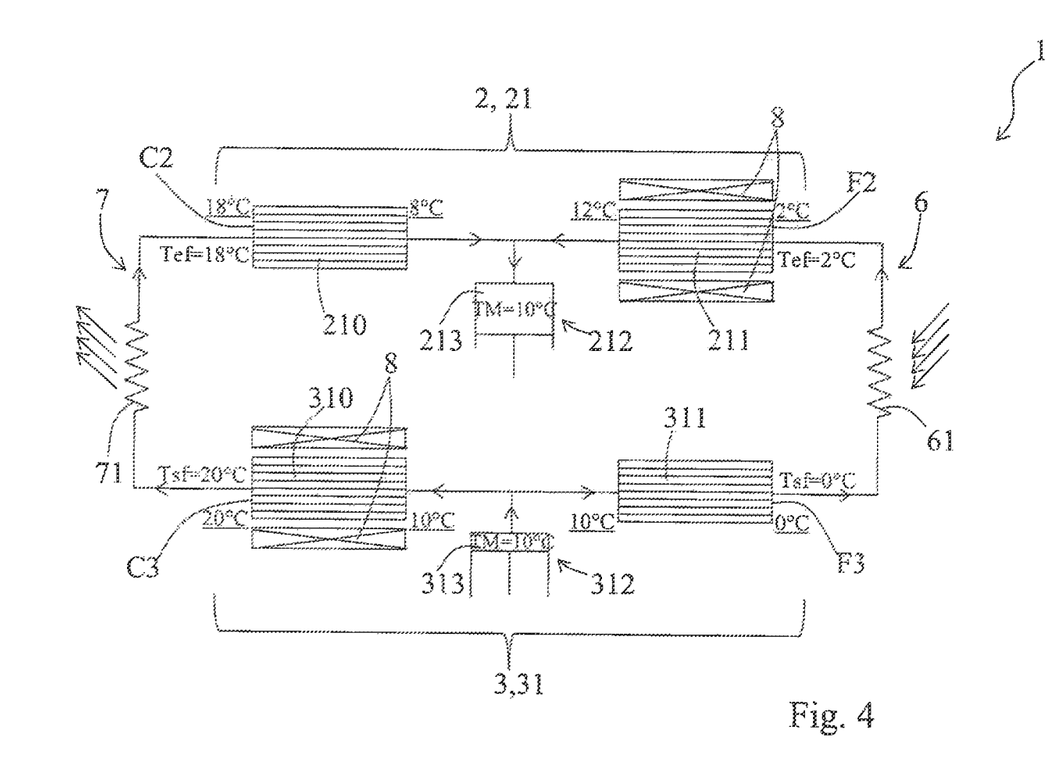
FIG. 4 represents the magnetocaloric unit of FIG. 3 in the following phase of the magnetocaloric cycle, FIG. 4' represents the magnetocaloric unit of FIG. 3, wherein support disks for the magnetocaloric stages are represented schematically.

To this purpose, FIGS. 3 and 4 represent the two phases of the magnetocaloric cycle of magnetocaloric stages 210, 211, 310, 311 and indicate the temperatures obtained during the operation of heat generator 1 according to the invention (the temperatures of the magnetocaloric materials forming the ends of the magnetocaloric stages are underlined). The sub-modules 21 and 31 are in fluidic communication through heat exchangers 61, 71 and their magnetocaloric stages 210, 211, 310, 311 are subjected to opposite magnetic stresses.

Considering FIG. 3, one notes that, in steady state, at the end of the heating of magnetocaloric stage 210 due to the application of a magnetic field by magnetic system 8, the heat transfer fluid exiting magnetocaloric stage 210 at the temperature Tsf of 20° C. flows through heat exchanger 71 of hot transfer circuit 7. It then enters magnetocaloric stage 310 at the temperature Tef of 18° C., which corresponds, thanks to the controlled heat exchange performed in exchanger 71, to the temperature of the material of the corresponding end of magnetocaloric stage 310, which has undergone cooling. The fluid exits magnetocaloric stage 310 at a temperature of 8° C. and is then led to common chamber 313 of piston 312. Simultaneously, the fluid exiting at the temperature Tsf of 0° C. magnetocaloric stage 211, which has undergone cooling, flows through heat exchanger 61 of cold transfer circuit 6 and enters magnetocaloric stage 311 at the temperature Tef of 2° C., which corresponds to the temperature of the material of the corresponding end of magnetocaloric stage 311, which has undergone heating. The heat transfer fluid exits magnetocaloric stage 311 at a temperature of 12° C. and is then led to common chamber 313 of piston 312, where it is mixed with the fluid coming from magnetocaloric stage 310. The average temperature TM of the fluid of this common chamber therefore corresponds to 10° C.

During the following phase represented in FIG. 4, at the end of the heating of magnetocaloric stage 310 due to the application of a magnetic field, the fluid entering this magnetocaloric stage 310 has a temperature of 10° C. (corresponding to the temperature of common chamber 313 and to that of the material of the corresponding end of magnetocaloric stage 310 that has undergone a temperature rise of 2° C. due to the magnetocaloric effect). The fluid exits this magnetocaloric stage 310 at a temperature Tsf of 20° C., flows through heat exchanger 71 and enters magnetocaloric stage 210 at a temperature Tef of 18° C., which corresponds to the temperature of the material of the corresponding end of this magnetocaloric stage 210, which has undergone a cooling cycle. The fluid exits this magnetocaloric stage 210 at a temperature of 8° C. and is then led to common chamber 213 of piston 212. Simultaneously, the fluid entering magnetocaloric stage 311 has a temperature of 10° C. (corresponding to the temperature of chamber 313 of piston 312 and to that of the material of the corresponding end of magnetocaloric stage 311 that has undergone a temperature decrease of 2° C. due to the magnetocaloric effect). The fluid exits this magnetocaloric stage 311 at a temperature Tsf of 0° C., flows through heat exchanger 61 and enters magnetocaloric stage 211 at a temperature Tef of 2° C., which corresponds to the temperature of the material of the corresponding end of magnetocaloric stage 211, which has undergone heating. The fluid exits magnetocaloric stage 211 at a temperature of 12° C. and is then led to common chamber 213 of piston 212. The average temperature of the fluid in this common chamber 213 therefore corresponds to 10° C.

It can be noted that, thanks to the invention, the circulation of the heat transfer fluid through heat exchangers 61, 71 allows giving this fluid a temperature that corresponds substantially to the temperature of the material of the end of the magnetocaloric stage the fluid is to flow through. Therefore, the heat exchange with the external applications, both on the hot side and on the cold side, does not affect the thermal gradient of heat generator 1 and thus generates no heat loss as is the case in the known similar generators. Of course, the fluidic circuit must be thermally insulated to ensure this result.

Moreover, this configuration with two magnetocaloric modules 2 and 3 connected at their ends by hot 7 and cold 6 transfer circuits, associated with a fluid distribution occurring only between magnetocaloric stages 210, 211, 310, 311 allows obtaining substantially the same fluid temperature in chambers 213 and 313 of pistons 212 and 312.

In addition, in a general way, this configuration with magnetocaloric modules connected at their ends by hot 7 and cold 6 transfer circuits allows achieving a heat generator with an optimized and reduced size. This configuration allows integrating the magnetocaloric stages located on a same hot or cold side of several magnetocaloric modules in common supports, having for example the shape of disks.

To this purpose, FIG. 4' represents the heat generator 1 according to the invention wherein two support disks D1 and D2 are represented schematically and carry the magnetocaloric stages 210 and 310, respectively 211 and 311, belonging to the two modules. The magnetic system 8 is represented schematically in the figures, and more specifically in FIG. 4'. The disks D1 and D2 carrying the magnetocaloric stages are fixed and the variation of the magnetic field is achieved by the displacement of a set of permanent magnets. The latter are therefore positioned on either side of the magnetocaloric stages, outside of the disks D1 and D2, on the left and on the right of the magnetocaloric stages, and not above and below as shown in the figures.

The heat generator 1 comprises preferably more than two heat modules 2, 3, and the whole of the magnetocaloric stages is mounted in the two support disks D1 and D2. So, the stages connected to cold transfer circuit 6 are integrated in a disk D2 and the stages connected to the transfer circuit 7 are integrated in a disk D1. These two disks D1 and D2 therefore form the two hot and cold branches mounted in parallel in said generator. One obtains this way an efficient and compact heat generator 1.

Figure 5:
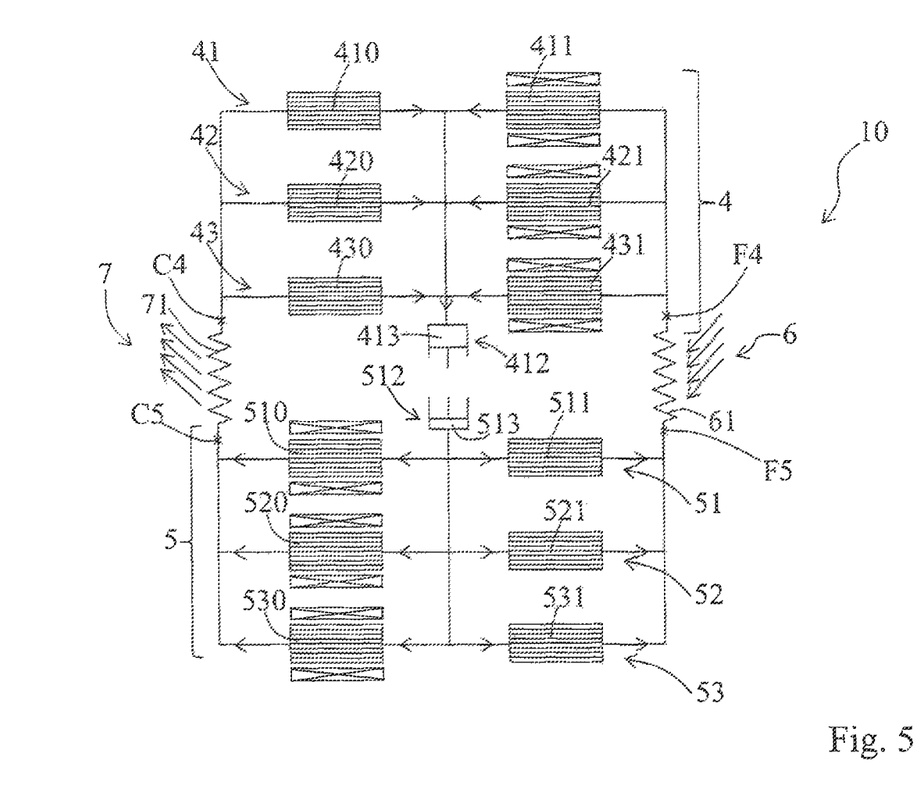
FIG. 5 is a schematic view of a magnetocaloric unit according to a variant of the invention.

An embodiment variant is represented in FIG. 5. The heat generator 10 shows an assembly of two magnetocaloric modules 4 and 5 comprising each three magnetocaloric sub-modules 41, 42, 43 and 51, 52, 53, connected with each other in parallel in the corresponding modules 4, 5. The two magnetocaloric modules 4 and 5 are connected through a cold transfer circuit 6 at their cold ends F4 and F5 and through a hot transfer circuit 7 at their hot ends C4 and C5. Two single-acting pistons 412 and 512 circulate the heat transfer fluid through heat generator 10. To this purpose, the chamber 431, respectively 513, of each piston 412, respectively 512, is connected with all magnetocaloric stages 410, 411, 420, 421, 430, 431 respectively 510, 511, 520, 521, 530, 531, of a magnetocaloric module 4, respectively 5. Even though it includes more magnetocaloric stages, such a configuration remains compact, does not require more circulating means for the heat transfer fluid than heat generator 1 of FIGS. 3 and 4 and has the same advantages than those described with regard to said heat generator 1. Also here, all magnetocaloric stages 410, 420, 430, 510, 520, 530, respectively 411, 421, 431, 511, 521, 531, can be mounted in two support disks, which are not represented, in order to optimize the size of heat generator 10.

Figure 6:
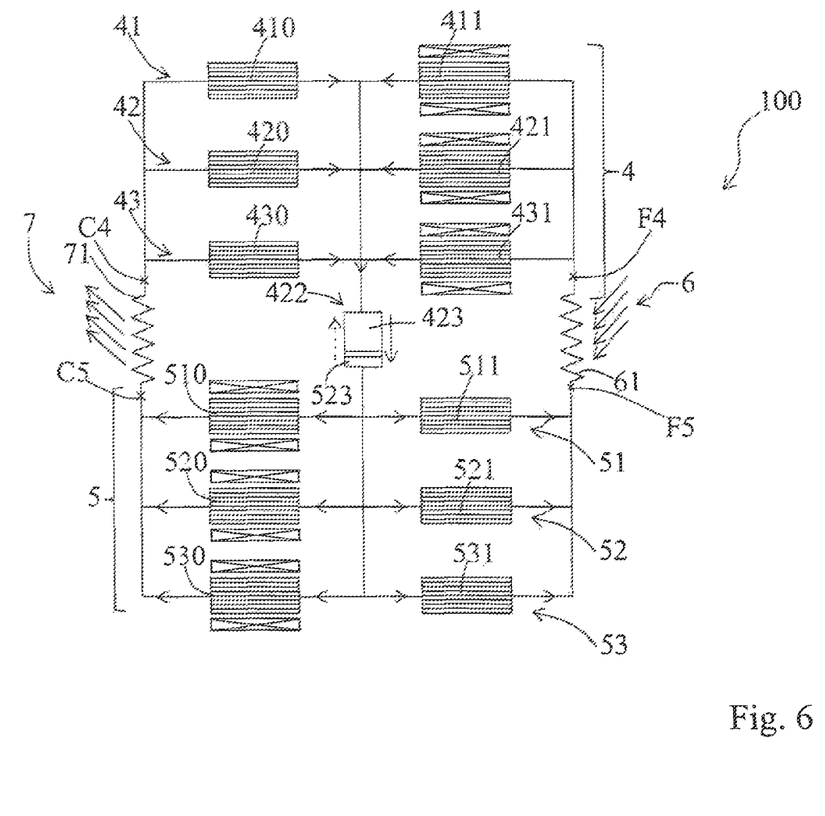
FIG. 6 is a schematic view of a magnetocaloric unit according to another variant of the invention.

Another embodiment variant is represented in FIG. 6. It illustrates a heat generator 100 differing from heat generator 10 of FIG. 5 by the means for circulating the heat transfer fluid. Only one piston 422 circulates the heat transfer fluid through this heat generator 100. This piston 422 is double-acting and comprises two chambers 423 and 523, each of them being connected with all magnetocaloric stages 410, 411, 420, 421, 430, 431 respectively 510, 511, 520, 521, 530, 531, of a magnetocaloric module 4, respectively 5. In other words, one single circulating means in the form of a double-acting piston 422, each chamber 423, 523 of which communicates with all magnetocaloric stages 410, 411, 420, 421, 430, 431, 510, 511, 520, 521, 530, 531, of the two magnetocaloric modules 4 and 5 ensures the circulation of the heat transfer fluid. This increases the compactness of heat generator 100. Such a configuration is possible since, as stated previously, the temperature of the heat transfer fluid is substantially the same in both chambers 423 and 523 of piston 422, so that the thermal bridges existing between the two adjacent chambers 423 and 523 will be very limited (less than 0.1° C.) and will have no negative effect on the efficiency of heat generator 100. Of course, this heat generator 100 shows the same advantages as those described regarding heat generator 10 represented in FIG. 5. Also here, all magnetocaloric stages 410, 420, 430, 510, 520, 530, respectively 411, 421, 431, 511, 521, 531, can be mounted in two support disks in order to optimize the size of heat generator 100.

Figure 7:
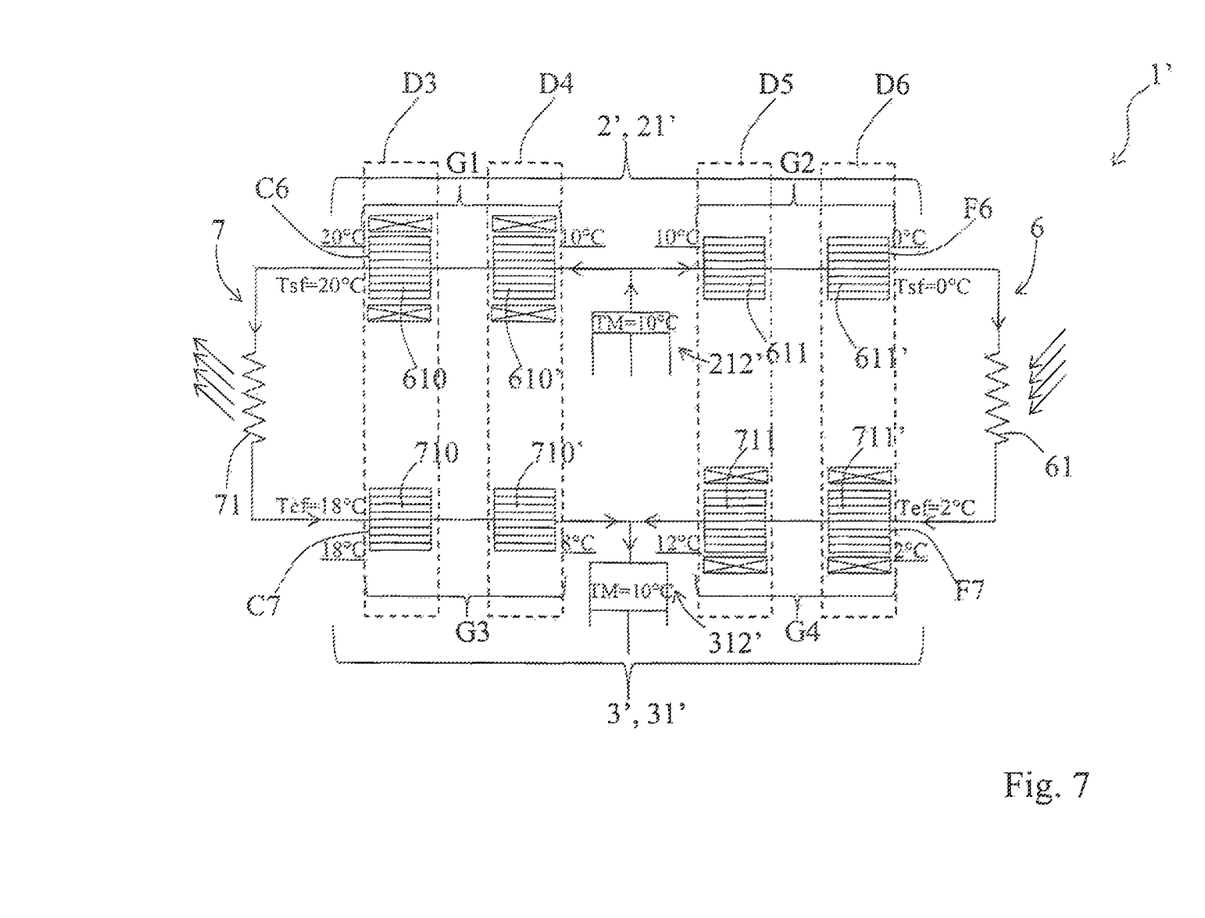
FIG. 7 is a schematic view of a variant of heat generator 1 of FIGS. 3 and 4.

The heat generator 1' represented in FIG. 7 is a variant of heat generator 1 of FIGS. 3 and 4. It has the same advantages as the latter and differs from it mainly by the presence of several magnetocaloric stages 610, 610', 611, 611', 710, 710', 711, 711' in each of the two heat modules 2', 3' represented. Also in this variant, the heat modules 2', 3' include one single sub-module 21', 31'. Even though this is not illustrated, the invention also provides the realization of modules 2', 3' including several sub-modules. Increasing the number of magnetocaloric stages allows increasing the temperature gradient obtained in steady state between the hot ends C6, C7 and the cold ends F6, F6 of the heat generator. To this purpose, in the sub-modules 2', 21' and 3', 31', the stages are grouped in two stage groups G1, G2 and G3, G4 and connected serially. To optimize the thermal gradient even more, the magnetocaloric stages 610, 610', 611, 611', 710, 710', 711, 711' of each module 2', 3' include magnetocaloric materials whose Curie temperatures are different and increasing from the cold end F6, F7 to the corresponding hot end C6, C7.

Also here all magnetocaloric stages 610, 610', 611, 611', 710, 710', 711, 711' can be mounted in support disks in order to optimize the size of heat generator 1'. To this purpose, heat generator 1' represented in FIG. 7 includes four disks represented schematically and identified by references D3, D4, D5, D6.

Figure 8:
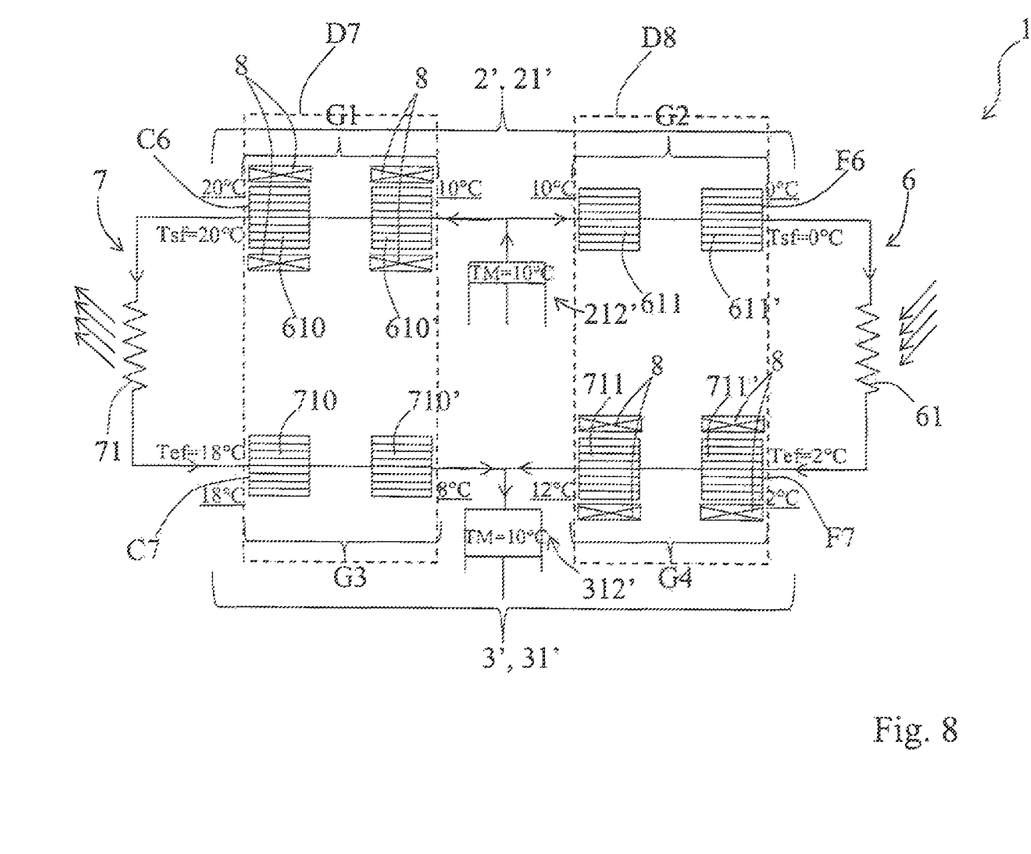
FIG. 8 is a schematic view of a variant of heat generator of FIG. 7.

To increase further the compactness of the heat generator, the magnetocaloric stages 610, 610', 710, 710', respectively 611, 611', 711, 711', can be mounted in only two disks, that is to say disks D7 and D8 represented schematically in FIG. 8.

Figure 9:
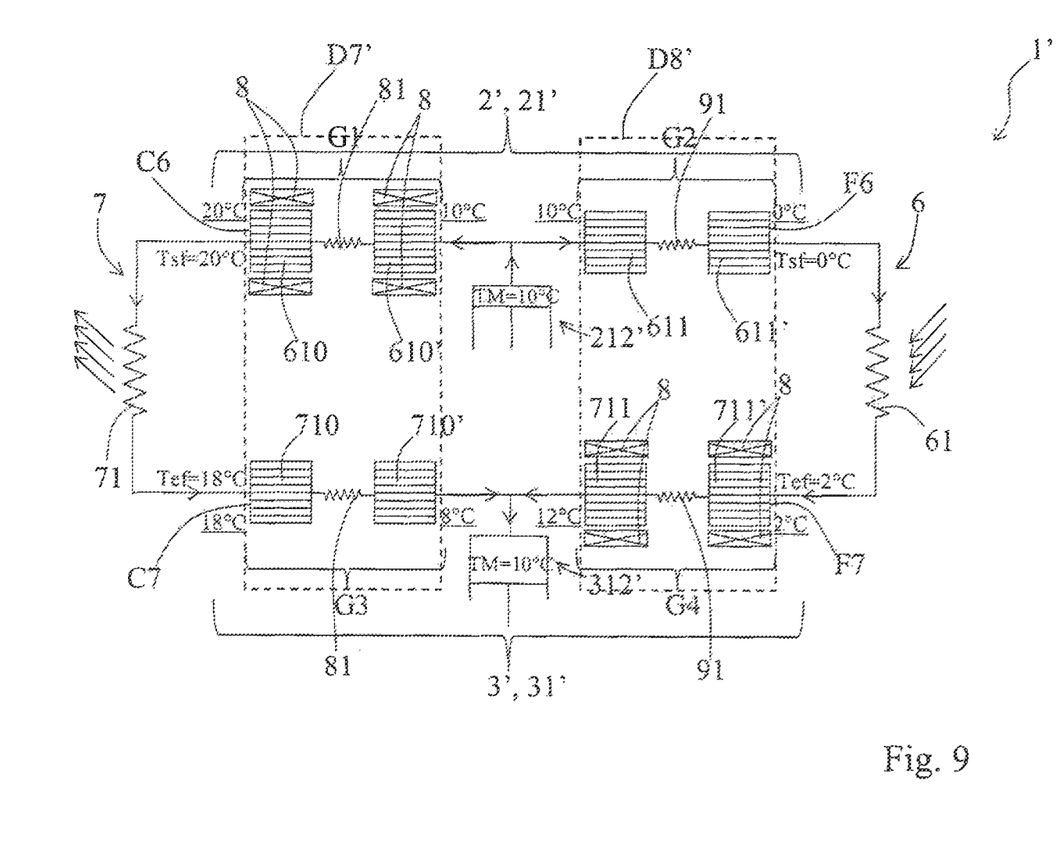
FIG. 9 is a schematic view of a variant of heat generator of FIG. 8.

FIG. 9 represents a heat generator 1" according to another variant of that represented in FIG. 7, wherein intermediate heat exchangers 81, 91 are arranged serially in the fluid circuit, between the magnetocaloric stages 610 and 610', 710 and 710', respectively 611 and 611', 711 and 711' forming said groups G1, G2. These intermediate heat exchangers 81, 91 can be for example connected to a Peltier effect device or to a similar device, and they can modify the temperature of said magnetocaloric stages 610, 610', 611, 611', 710, 710', 711, 711'. These intermediate heat exchangers 81, 91 can perform a heat exchange that can be either continuous or take place only during a part of the operating cycle of heat generator 1". They thus can aim to pre-cool or put at an optimal initial temperature magnetocaloric stages 611, 611', 711, 711' located on the side of cold exchange circuit 6 when starting heat generator 1" so that said stages reach quicker a temperature close to their Curie temperature, that is to say the temperature at which their magnetocaloric effect is the strongest. On the same way the intermediate heat exchangers 81 mounted on the side of hot exchange circuit 7 can be used to pre-heat or put at an optimal initial temperature magnetocaloric stages 610, 610', 710, 710' located on the side of hot exchange circuit 7 when starting heat generator 1" so that said stages reach quicker a temperature close to their Curie temperature, that is to say the temperature at which their magnetocaloric effect is the strongest. This initial setting to an optimal temperature allows reaching faster the steady state in which the temperature gradient between the hot side and the cold side of heat generator 1" is achieved. This allows increasing the useful output of heat generator 1". In a non illustrated embodiment variant, the intermediate heat exchangers 91 located on the side of cold exchange circuit 6 can be connected serially with cold heat exchanger 61 and the intermediate heat exchangers 81 located on the side of hot exchange circuit 7 can be connected serially with hot heat exchanger 71.

A heat generator 1, 10, 100, 1', 1" as described therefore allows optimizing both its heat exchanges and its size while improving its efficiency with respect to the prior art.

Possibilities for Industrial Application:

This description shows clearly that the invention allows reaching the goals defined, that is to say exchange thermal energy with the outside of the magnetocaloric heat generator without degrading the available energy nor the temperature gradient in the different magnetocaloric stages, in order to improve the efficiency of the generator. This is made possible by the presence of the fluidic connection and the controlled heat exchange between the two magnetocaloric modules 2 and 3, 2' and 3', as well as 4 and 5, operating in opposition and connected at their hot ends C2, C3, C4, C5, C6, C7 and their cold ends F2, F3, F4, F5, F6, F7 by a hot transfer circuit 7 and a cold transfer circuit 6 that allow to act appropriately on the temperature of the heat transfer fluid.

Furthermore, the heat generator 1, 10, 100, 1', 1" according to the invention has a reduced size and requires less components for circulating the heat transfer fluid than the generators known from the prior art, and requires therefore less energy to actuate these circulating means. Furthermore, the generator according to the invention also allows optimizing its efficiency by avoiding the negative effects of the thermal bridges in the circulating means of the heat transfer fluid.

The present invention is not restricted to the examples of embodiment described, but extends to any modification and variant which is obvious to a person skilled in the art while remaining within the scope of the protection defined in the attached claims. In particular, even though the embodiment examples described include one single assembly of two magnetocaloric modules 2, 3, 4, 5, 2', 3', the invention also provides the possibility to increase the number of assemblies in a same generator to increase its thermal output or the temperature difference between its hot and cold ends.

The invention claimed is:

1. A magnetocaloric heat generator (1, 10, 100, 1', 1") comprising:
    at least one assembly of at least two magnetocaloric modules (2, 3, 4, 5, 2', 3'), the at least two magnetocaloric modules (2, 3, 4, 5, 2', 3') being connected serially with one another, each of the at least two magnetocaloric modules having a hot end and a cold end, the magnetocaloric generator having a hot heat exchanger (71) and a cold heat exchanger (61);
    wherein each magnetocaloric module comprise at least one circulating member,
    a heat transfer fluid circulated by the at least one circulating member (212, 312, 412, 512, 422, 212', 312'), the heat transfer fluid flowing through each of the at least two magnetocaloric modules, each of the magnetocaloric modules (2, 3, 4, 5, 2', 3') comprises at least two magnetocaloric stages (210, 211, 310, 311, 410, 411, 420, 421, 430, 431, 510, 511, 520, 521, 530, 531, 610, 610', 611, 611', 710, 710', 711, 711') comprising magnetocaloric materials which are in opposite magnetic phase with respect to each other, such that when one of said at least two magnetocaloric stages undergoes a temperature rise due to application of a magnetic field, the other of the at least two magnetocaloric stages undergoes a temperature drop due to removing or reduction of the magnetic field,
    the at least one circulating member (212, 312, 412, 512, 422, 212', 312') is in fluidic communication with the at least two magnetocaloric stages of each of the magnetocaloric modules and each of the at least one circulating member is connected between ends of the said magnetocaloric stages of a corresponding magnetocaloric module of the at least two magnetocaloric modules, wherein said magnetocaloric stages of said corresponding magnetocaloric module have opposite magnetic phases, such that the heat transfer fluid flows through each of said magnetocaloric stages of said corresponding magnetocaloric module in opposite directions,
    the magnetocaloric stages (210, 211, 310, 311, 410, 411, 420, 421, 430, 431, 510, 511, 520, 521, 530, 531, 610, 610', 611, 611', 710, 710', 711, 711') are made of magnetocaloric materials arranged so that a magnetocaloric effect is the same in all of the magnetocaloric stages,
    the cold ends (F2, F3, F4, F5, F6, F7) of the at least two magnetocaloric modules (2, 3, 4, 5, 2', 3') are in fluidic communication via a cold transfer circuit (6) used by the heat transfer fluid and comprising the cold heat exchanger (61) for a heat exchange with a first external circuit,
    the hot ends (C2, C3, C4, C5, C6, C7) of the at least two magnetocaloric modules (2, 3, 4, 5, 2', 3') are in fluidic communication by means of via a hot transfer circuit (7) used by the heat transfer fluid and comprising the hot heat exchanger (71) for a heat exchange with a second external circuit, and
    the cold and the hot heat exchangers (61, 71) are constructed so that the difference of inlet and outlet temperatures of the heat transfer fluid in each of the cold and the hot heat exchangers (61, 71) is equal to the temperature jump of each magnetocaloric stage (210, 211, 310, 311, 410, 411, 420, 421, 430, 431, 510, 511, 520, 521, 530, 531, 610, 610', 611, 611', 710, 710', 711, 711') when the magnetic phase of each magnetocaloric stage changes.

2. The generator according to claim 1, wherein each of the magnetocaloric modules (2, 3, 4, 5, 2', 3') comprises at least two magnetocaloric sub-modules (21, 31, 41, 42, 43, 51, 52, 53, 21', 31') including each at least two magnetocaloric stages (210, 211, 310, 311, 410, 411, 420, 421, 430, 431, 510, 511, 520, 521, 530, 531, 610, 610', 611, 611', 710, 710', 711, 711'), the at least two magnetocaloric sub-modules (21, 31, 41, 42, 43, 51, 52, 53, 21', 31') are mounted in parallel.

3. The generator according to claim 2, wherein each of the magnetocaloric sub-modules (21', 31') comprises at least two groups (G1, G2, G3, G4) of magnetocaloric stages (610, 610', 611, 611'; 710, 710', 711, 711'), the at least two groups (G1, G2, G3, G4) of magnetocaloric stages being in fluidic communication with each other via at least one circulating member (212', 312') in each of the at least two groups (G1, G2, G3, G4), the magnetocaloric stages (610, 610', 611, 611'; 710, 710', 711, 711') are connected serially.

4. The generator according to claim 3, wherein a hot intermediate heat exchanger (81, 91) is arranged between two consecutive magnetocaloric stages (610 and 610', 710 and 710') of the groups (G1, G3) of magnetocaloric stages connected to the hot transfer circuit (7), and a cold intermediate heat exchanger (91) is arranged between two consecutive magnetocaloric stages (611 and 611', 711 and 711') of the groups (G2, G4) of magnetocaloric stages connected to the cold transfer circuit (6).

5. The generator according to claim 4, wherein each of the cold and the hot intermediate heat exchangers (91, 81) is connected to the respective cold and hot heat exchanger (61, 71) of the corresponding cold and hot transfer circuit (6, 7).

6. The generator according to claim 4, wherein the hot intermediate heat exchangers (81) of the groups (G1, G3) of magnetocaloric stages connected to the hot transfer circuit (7) are connected to each other and in that the cold intermediate heat exchangers (91) of the groups (G2, G4) of magnetocaloric stages connected to the cold transfer circuit (6) are connected to each other.

7. The generator (1, 10) according to claim 1, wherein the at least one circulating member (212, 312, 412, 512) is realized in the form comprising single-acting pistons and in that the chamber (213, 313, 413, 513) of every piston is in fluidic communication with the magnetocaloric stages (201, 211, 310, 311, 410, 411, 420, 421, 430, 431; 510, 511, 520, 521, 530, 531) of each of the magnetocaloric module (2, 3, 4, 5).

8. The generator (100) according to claim 1, wherein the at least one circulating member (422) is realized in the form comprising a double-acting piston and in that each chamber (423, 523) of the piston (422) is in fluidic communication with the magnetocaloric stages (410, 411, 420, 421, 430, 431; 510, 511, 520, 521, 530, 531) of each of the magnetocaloric module (4, 5).

9. The generator according to claim 1, wherein the generator comprises a magnetic system arranged to subject the magnetocaloric stages (210, 211, 310, 311, 410, 411, 420, 421, 430, 431, 510, 511, 520, 521, 530, 531, 610, 610', 611, 611', 710, 710', 711, 711') to a variable magnetic field so that the magnetocaloric stages (211, 311, 411, 421, 431, 511, 521, 531) located at the cold end (F2, F3, F4, F5) and the magnetocaloric stages (410, 420, 430, 510, 520, 530) located at the hot end (C2, C3, C4, C5) are in opposite heating or cooling phases.

10. The generator according claim 1, wherein the magnetocaloric stages are mounted in disk-shaped supports (D1, D2, D3, D4, D5, D6, D7, D8, D7', D8'), each of the supports including at least one magnetocaloric stage (210, 211, 310, 311, 410, 411, 420, 421, 430, 431, 510, 511, 520, 521, 530, 531, 610, 610', 611, 611', 710, 710', 711, 711') of each of the magnetocaloric modules (2, 3, 4, 5, 2', 3').

11. The generator according to claim 1, wherein the at least one circulating member is located between consecutive ends of the magnetocaloric stages and is not located at the cold and hot ends sides of the magnetocaloric modules.

12. A magnetocaloric heat generator (1, 10, 100, 1', 1") comprising
at least one assembly of at least two magnetocaloric modules (2, 3, 4, 5, 2', 3'), the at least two magnetocaloric modules being connected serially, each of the at least two magnetocaloric modules having a hot end and a cold end and at least two magnetocaloric sub-modules (21, 31, 41, 42, 43, 51, 52, 53, 21', 31') including each at least two magnetocaloric stages,
the magnetocaloric heat generator having a hot heat exchanger (71) and a cold heat exchanger (61),
wherein each magnetocaloric module comprises at least one circulating member,
a heat transfer fluid is circulated by the at least one circulating member (212, 312, 412, 512, 422, 212', 312') through each of the at least two magnetocaloric modules, each of the at least two magnetocaloric modules (2, 3, 4, 5, 2', 3') comprises at least two magnetocaloric stages (210, 211, 310, 311, 410, 411, 420, 421, 430, 431, 510, 511, 520, 521, 530, 531, 610, 610', 611, 611', 710, 710', 711, 711') of magnetocaloric material, the at least two magnetocaloric stages being in opposite magnetic phases, such that when one of said at least two magnetocaloric stages undergoes a temperature rise due to the application of a magnetic field, the other of the at least two magnetocaloric stages undergoes a temperature drop due to removing or reduction of the magnetic field,
the at least one heat transfer fluid circulating member (212, 312, 412, 512, 422, 212', 312') is in fluidic communication with the at least two magnetocaloric stages of each of the magnetocaloric modules and each of the at least one circulating member is connected between consecutive ends of the said at least two magnetocaloric stages of a corresponding magnetocaloric module of the at least two magnetocaloric modules, wherein said magnetocaloric stages of said corresponding magnetocaloric module have opposite magnetic phases, such that the heat transfer fluid flows through each of said magnetocaloric stages of said corresponding magnetocaloric module in opposite directions,
the at least two magnetocaloric stages (210, 211, 310, 311, 410, 411, 420, 421, 430, 431, 510, 511, 520, 521, 530, 531, 610, 610', 611, 611', 710, 710', 711, 711') are made of magnetocaloric materials arranged so that magnetocaloric effect is the same in all of the at least two magnetocaloric stages,
the cold ends (F2, F3, F4, F5, F6, F7) of the magnetocaloric modules (2, 3, 4, 5, 2', 3') are in fluidic communication via a cold transfer circuit (6) comprising the cold heat exchanger (61) through which the heat transfer fluid flows and exchanges heat with an first external circuit,
the hot ends (C2, C3, C4, C5, C6, C7) of the magnetocaloric modules (2, 3, 4, 5, 2', 3') are in fluidic communication via a hot transfer circuit (7) comprising the hot heat exchanger (71) through which the heat transfer fluid flows and exchanges heat with an second external circuit, and
the heat exchangers (61, 71) of the cold and the hot transfer circuits are constructed so that differences of inlet and outlet temperatures of the heat transfer fluid in each of the cold and the hot heat exchangers (61, 71) of the cold and the hot transfer circuits (6, 7) is equal to the temperature jump of each magnetocaloric stage (210, 211, 310, 311, 410, 411, 420, 421, 430, 431, 510, 511, 520, 521, 530, 531, 610, 610', 611, 611' 710, 710', 711, 711') when the magnetic phase of each magnetocaloric stage changes.

13. A magnetocaloric heat generator comprising:
at least one assembly of at least two magnetocaloric modules connected serially, each of the at least two magnetocaloric modules having a hot end and a cold end, the magnetocaloric heat generator having a hot heat exchanger and a cold heat exchanger;
wherein each magnetocaloric module comprises at least one circulating member, a heat transfer fluid, circulated by the at least one circulating member, flowing through each of the at least two magnetocaloric modules, each of the magnetocaloric modules comprises at least two magnetocaloric stages being in opposite magnetic phase with respect to each other such that when one of said at least two magnetocaloric stages undergoes a temperature rise due to application of a magnetic field, another of the at least two magnetocaloric stage undergoes a temperature drop due to removing or reduction of the magnetic field, the at least one circulating member being in fluidic communication with the at least two magnetocaloric stages of each of the at least two magnetocaloric modules and each of the at least one circulating member is connected between ends of the said magnetocaloric stages of a corresponding magnetocaloric module of the at least two magnetocaloric modules, wherein said magnetocaloric stages of said corresponding magnetocaloric module have opposite magnetic phases such that the heat transfer fluid flows through each of said magnetocaloric stages of said corresponding magnetocaloric module in opposite directions, the magnetocaloric stages are made of magnetocaloric materials arranged so that a magnetocaloric effect is the same in all of the magnetocaloric stages, the cold ends of the at the least two magnetocaloric modules are in fluidic communication via a cold transfer circuit used by the heat transfer fluid and comprising the cold heat exchanger for a heat exchange with a first external circuit, the hot ends of the at least two magnetocaloric modules are in fluidic communication via a hot transfer circuit used by the heat transfer fluid and comprising the hot heat exchanger for a heat exchange with a second external circuit, and the cold heat exchanger and the hot heat exchanger are arranged so that the difference of inlet and outlet temperature of the heat transfer fluid in each of the cold heat exchanger and the hot heat exchanger is at most forty percent of the magnetocaloric effect applied to each of the at least two magnetocaloric stages.

14. The generator according to claim 13, wherein each of the magnetocaloric modules comprises at least two magnetocaloric sub-modules including each at least two magnetocaloric stages mounted in parallel.

15. The generator according to claim 14, wherein each of the magnetocaloric sub-modules comprises at least two groups of magnetocaloric stages, the at least two groups of magnetocaloric stages being in fluidic communication with each other via the at least one circulating member and in each of the groups the magnetocaloric stages are connected serially.

16. The generator according to claim 15, wherein a hot intermediate heat exchanger is arranged between two consecutive magnetocaloric stages in one of the at least two groups of magnetocaloric stages connected to the hot transfer circuit and a cold intermediate heat exchanger is arranged between two consecutive magnetocaloric stages in another of the at least two groups of magnetocaloric stages connected to the cold transfer circuit.

* * * * *